United States Patent [19]
Bergmann et al.

[11] Patent Number: 5,970,708
[45] Date of Patent: Oct. 26, 1999

[54] HYDRAULIC STEERING ASSEMBLY WITH CHANGE IN TRANSMISSION RATIO AND FLOW AMPLIFICATION

[75] Inventors: Erhard Bergmann, Mirow; Gerhard Voss, Parchim; Manfred Schildmann, Karrenzin, all of Germany

[73] Assignee: Hydraulik Nord GmbH, Parchim, Germany

[21] Appl. No.: 08/960,884

[22] Filed: Oct. 30, 1997

[30] Foreign Application Priority Data

Nov. 2, 1996 [EP] European Pat. Off. ............. 96117556

[51] Int. Cl.⁶ .............................. F15B 9/10; F16D 31/02
[52] U.S. Cl. ...................... 60/384; 91/375 R; 137/625.24
[58] Field of Search ............................ 60/384, 385, 386; 137/625.15, 625.22, 625.23, 625.24, 625.31, 625.32, 596.12, 596.13; 91/375 R

[56] References Cited

U.S. PATENT DOCUMENTS

| | | | |
|---|---|---|---|
| 4,470,432 | 9/1984 | Kervagoret | 137/625.22 |
| 4,566,272 | 1/1986 | Petersen et al. | 60/384 |
| 4,759,182 | 7/1988 | Haarstad | 60/384 |
| 4,838,314 | 6/1989 | Gage | 137/625.24 |
| 4,862,690 | 9/1989 | Haarstad | 60/384 |
| 4,875,542 | 10/1989 | Uchida et al. | 91/375 R X |
| 4,958,493 | 9/1990 | Schutten et al. | 60/384 |
| 5,020,618 | 6/1991 | Nagao | 60/384 X |
| 5,253,729 | 10/1993 | Suzuki | 137/625.23 X |
| 5,620,026 | 4/1997 | Stephenson et al. | 137/625.24 |
| 5,634,495 | 6/1997 | Rasmussen et al. | 137/625.24 |
| 5,638,864 | 6/1997 | Haarstad et al. | 137/625.24 |
| 5,819,532 | 10/1998 | Wang et al. | 60/384 |

*Primary Examiner*—John E. Ryznic
*Attorney, Agent, or Firm*—Darby & Darby

[57] ABSTRACT

In order to continuously change the transmission ratio between power-assisted steering mode and emergency steering mode and to maximize the flow of hydraulic oil in the power-assisted steering mode when the steering wheel is rapidly turned, a steering assembly is proposed which uses a common line which bypasses the metering pump, as a supply line for flow amplification during power-assisted operation and as a return line for changing the transmission ratio during emergency operation. This common line is connected to selected supply lines by way of throttles and with corresponding cylinder lines or with all cylinder lines by way of throttles. Steering devices of this type are employed in mobile equipment, in particular in slowly moving vehicles.

8 Claims, 7 Drawing Sheets

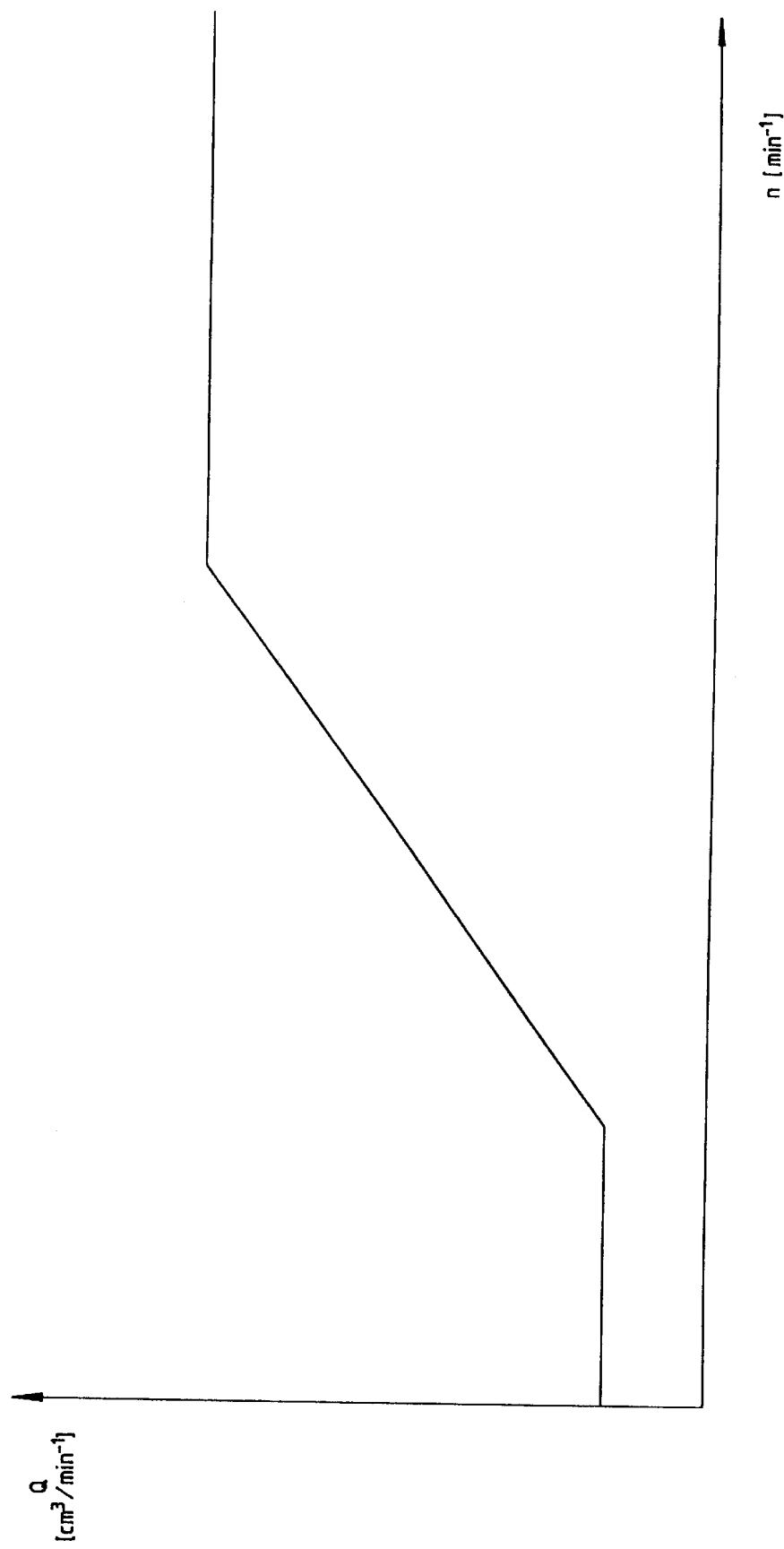

HYDRAULIC STEERING ASSEMBLY WITH CHANGE IN TRANSMISSION RATIO AND FLOW AMPLIFICATION

BACKGROUND OF THE INVENTION

The present invention relates to a hydraulic steering assembly with change in transmission ratio and flow amplification, which includes a controllable control valve, a metering pump, a supply connection, a return connection and two cylinder connections.

Steering devices of this type are employed predominantly in slowly moving vehicles with high axle loads.

Hydraulic steering devices primarily include a rotary control valve and an orbit displacer. The rotary control valve is constructed of an outer control sleeve fitted in a housing and an inner control piston disposed concentrically in the control sleeve. The control piston is connected through an internal spline to the steering wheel and also through a pin connection to the control sleeve for relative movement thereto. The control sleeve is rigidly connected to the rotor gearwheel of the orbit displacer through a pin connection and a drive shaft. The control piston is centered relative to the control sleeve by way of a spring element. Control piston and control sleeve are able to rotate relative to each other within limits against the biasing force of this spring element. Commutator bore holes provide a hydraulic connection between the rotary control valve and the orbit displacer.

The hydraulic steering assembly includes connections for connecting to a supply line, to a return line and to two cylinder lines which are connected to the steering cylinder.

Although these hydraulic steering devices feature a high displacement volume, they are not capable of changing the transmission ratio between the power-assisted steering mode and the emergency steering mode. Consequently, if the supply pump fails and the steering assembly suddenly switches to the emergency mode, the entire steering force required to steer the vehicle has to be applied to the steering wheel manually. This is a safety risk, particularly in highway traffic.

For this reason, there is a long-felt need to provide steering units which make possible a change the transmission ratio when the emergency steering mode is engaged, thereby reducing the necessary manual steering force.

DESCRIPTION OF THE RELATED ART

A steering assembly of this type is known from DE 22 28 531 C2. The steering assembly has an orbit displacer with two displacement units connected in parallel, wherein the moveable gear teeth are mechanically connected to each other through a spline shaft. In the hydraulic connection lines between the two displacement units, there are disposed reversing valves which connect both displacement units when hydraulic oil is present, i.e. in power-assisted steering mode, while rendering ineffective one displacement unit in emergency steering mode, i.e. when the supply pump fails.

As a result of the reduced displacement volume, a larger number of turns of the steering wheel is required to turn the steered wheels by a certain angle, while the actual steering force remains unchanged, assuming that the steering assembly is properly designed. The driver will then be able to handle the vehicle.

This design, however, is not very cost-effective and rather complex. As a result, the steering assembly is also subject to breakdown. Consequently, this steering assembly does not reduce the safety risk in highway traffic.

DE 44 07 308 C1 disclosed by the applicant of the present application describes another steering assembly capable of changing the transmission ratio. In emergency steering mode, several chambers of the metering pump are here switched off and connected to the return line. In power-assisted steering mode, all lines supply hydraulic oil to the steering cylinder, whereas in emergency steering mode only a limited number of lines supply the oil.

This steering assembly reliably switches to a different preselected transmission ratio should it become necessary for the steering assembly to suddenly operate in emergency steering mode.

All steering assemblies known in the art operate on the principle that in power-assisted steering mode all existing lines and chambers supply hydraulic oil to the steering cylinder, whereas in emergency steering mode some of the lines or chambers are switched off, i.e. are unpressurized and connected to the tank.

Consequently, in emergency steering mode all the hydraulic oil has to be taken in by the metering pump through several throttles which leads to volumetric losses. Moreover, the attainable transmission ratio is limited by the number of chambers and by the geometric dimensions. Furthermore, steering assemblies of this type can operate discontinuously, i.e. step-by-step.

In DE 195 03 331 C1, a steering assembly was proposed which would also be capable of changing the transmission ratio continuously. In power-assisted mode, a pressure-dependent control valve generates a shunt flow which bypasses the metering pump and merges with the main flow before the steering cylinder, essentially amplifying the flow. This shunt flow is balanced with the main flow so that the oil volume supplied to the steering cylinder with each turn of the steering wheel is essentially constant over the turning speed range of the steering wheel.

The range of the transmission ratios attainable in this steering assembly, however, is still limited by the geometric dimensions even when flow amplification is employed.

Another steering assembly with flow amplification capable of changing the transmission ratio between the power-assisted steering mode and the emergency steering mode is known from EP 0 362 534 B1.

This steering assembly also has a shunt flow bypassing the metering pump. The adjustable amplification throttle is disposed in the shunt flow and attains its maximum opening cross section when the control valve of the steering assembly is switched from the neutral position into a first operating position. Conversely, the opening cross section of the amplification throttle decreases to zero when the control valve is switched from the first operating position to the position of maximum displacement. The flow amplification attained in this manner is greatest in the first operating position and goes to zero when the position of maximum displacement is reached.

This characteristics enables a smooth steering control when the steering wheel is turned slowly, but creates significant problems when the steering wheel is turned faster, e.g. during rapid emergency maneuvers or when negotiating curves. Consequently, this steering assembly poses a considerable safety risk in highway traffic.

Even in this situation, the transmission ratio between the power-assisted steering mode and the emergency steering mode is limited by the characteristic dimensions and by potential oscillations generated in the spring-biased control valve at a high amplification volume.

SUMMARY OF THE INVENTION

It is therefore the object of the invention to develop a steering assembly of a type which enables a continuous change in the transmission ratio between the power-assisted steering mode and the emergency steering mode over a wide range and which in power-assisted steering mode increases the oil volume with increasing turning speed of the steering wheel up to a maximum value.

This object is solved by the utilizing a common line to serve during power-assisted steering mode as a supply line for flow amplification and to serve during emergency steering mode as a return line for the cylinder lines that are disconnected from the oil flow feed, and wherein the common line is connected to a predetermined number of the supply lines by way of flow amplification supply throttles and to the associated cylinder lines by way of flow amplification return throttles, and the common line is connected to all cylinder lines by way of second flow amplification return throttles. The first flow amplification return throttles are disposed in parallel with the associated second flow amplification return throttles, and the flow amplification supply throttle and the two flow amplification return throttles have a mutually coordinated opening characteristics.

Most advantageously, a steering assembly of simple design is provided which is capable of changing the transmission ratio as well as amplifying the flow, utilizing the same common line.

Another advantageous feature of the invention is that in emergency steering mode, the surplus oil is not discharged, but is redirected unpressurized within the steering assembly. Consequently, hydraulic oil has to be manually drawn from the tank only for those chambers of the metering pump which partake in supplying the oil. This design improves the volumetric efficiency and the steering response for the vehicle operator.

Advantageous embodiments are in that the cylinder lines of the steering assembly merge with a common line and the cylinder lines merge with a common line, wherein both lines are separated by a check valve closing in the direction of the common line.

Further, the common line merges with the supply lines between the input throttles and the supply throttles and with the cylinder lines between the return throttles and the throttles.

Further, the sum of the orifice cross sections of the closing flow amplification return throttle and of the opening flow amplification return throttle remain approximately constant from the neutral position to a predetermined excursion angle, the flow amplification supply throttle opens after reaching a predetermined excursion angle, but before the flow amplification return throttle closes, the flow amplification return throttle closes before reaching the maximum excursion angle, and the cross sections of the flow amplification supply throttle and the flow amplification return throttle become identical in size and change in an approximately identical fashion with increasing excursion angle.

Further, the cross sections of the flow amplification supply throttle and the first flow amplification return throttle increase after the second flow amplification return throttle closes.

Further, the cross sections of the flow amplification supply throttle are formed by an axial channel disposed in the supply line and by a radial bore, wherein both the axial channel and the radial bore in their respective neutral position have a negative overlap with a radial spacing.

Even further, the flow amplification return throttle is formed by a channel disposed in the cylinder line and by a radial bore, wherein both the channel and the radial bore in their respective neutral position have a negative overlap with a radial spacing.

In addition, the flow amplification return throttle is formed by a channel disposed in the cylinder line and by a radial bore, wherein both the channel and the radial bore in their respective neutral position have a positive overlap.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views:

FIG. 7 is a diagram illustrating the oil supply characteristics as a function of the rotation speed of the steering wheel.

DETAILED DESCRIPTION OF THE PRESENTLY PREFERRED EMBODIMENTS

Figure 1:
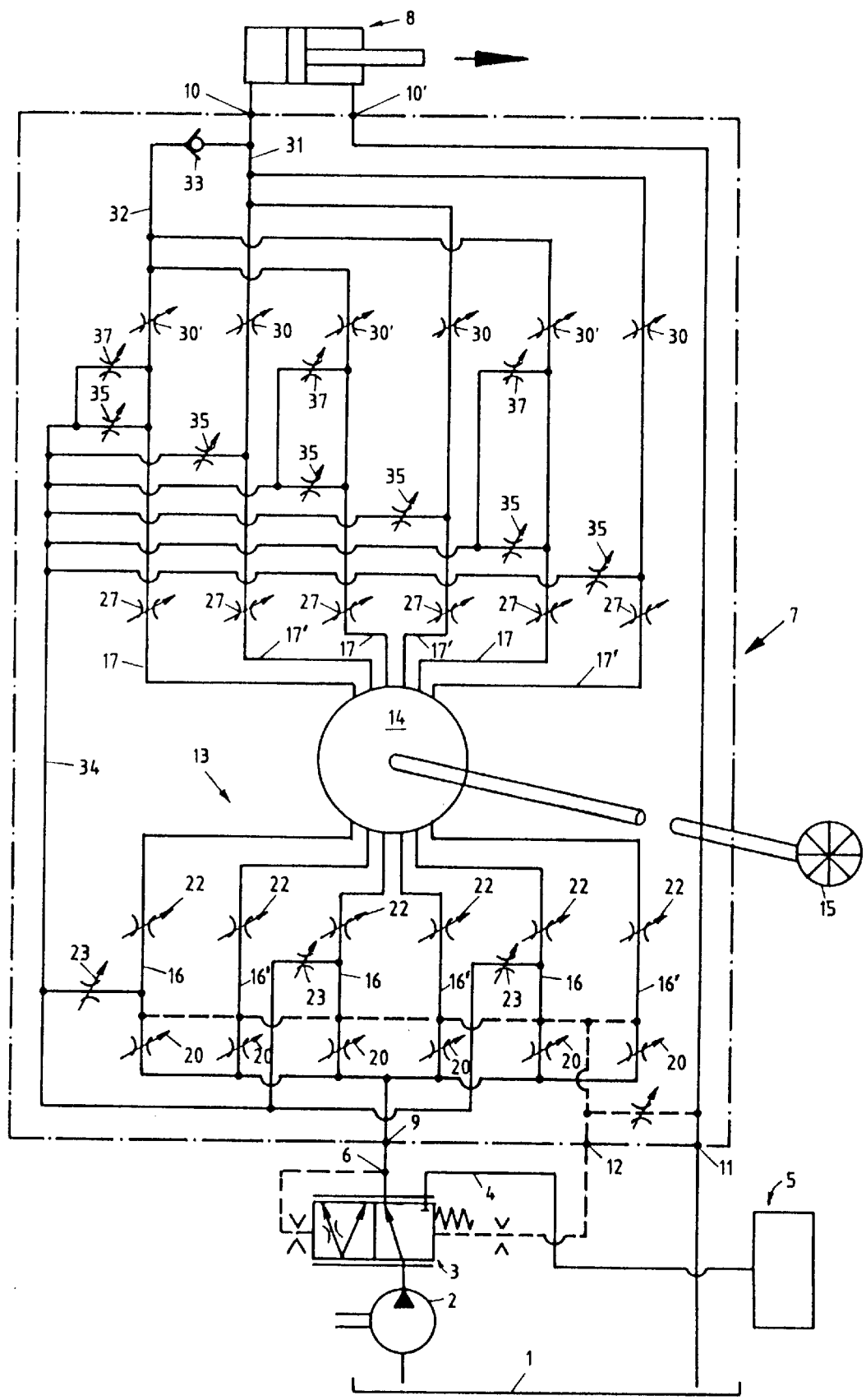
FIG. 1 is a simplified block diagram of a steering assembly in an embodiment with load-sensing.
Figure 2:
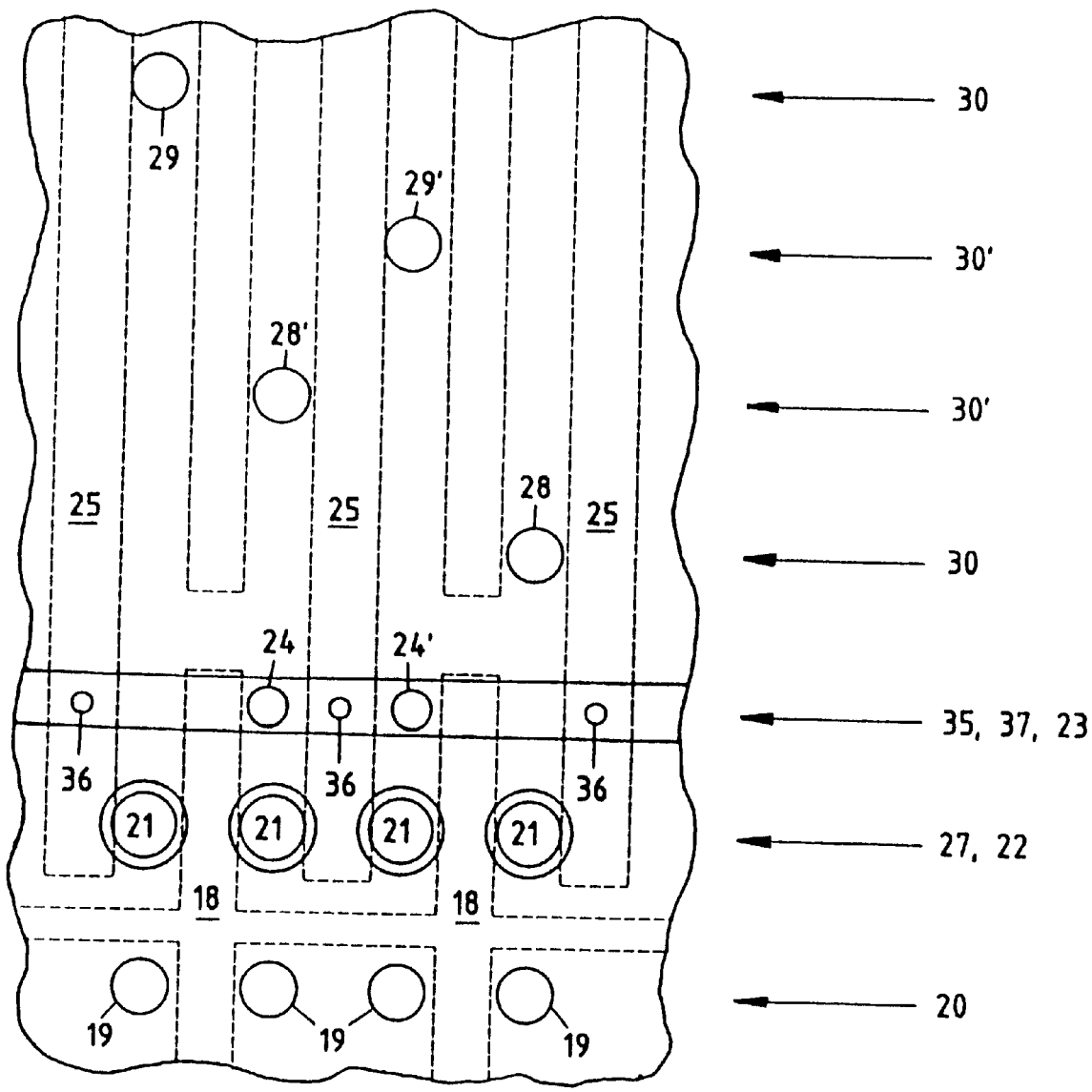
FIG. 2 is a control valve of the steering assembly in neutral position.
Figure 3:
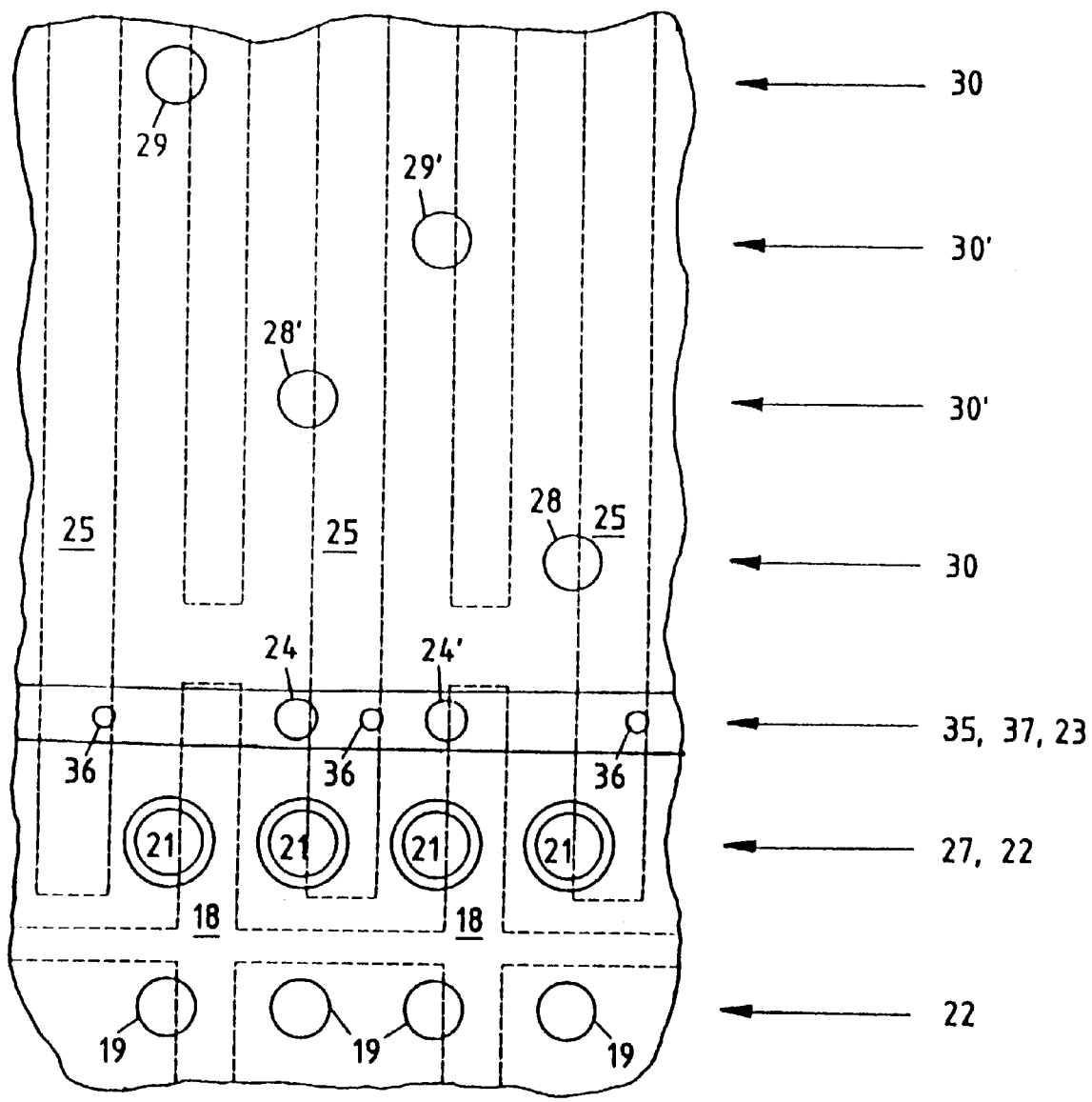
FIG. 3 is a control valve in power-assisted steering mode when making a right turn.
Figure 4:
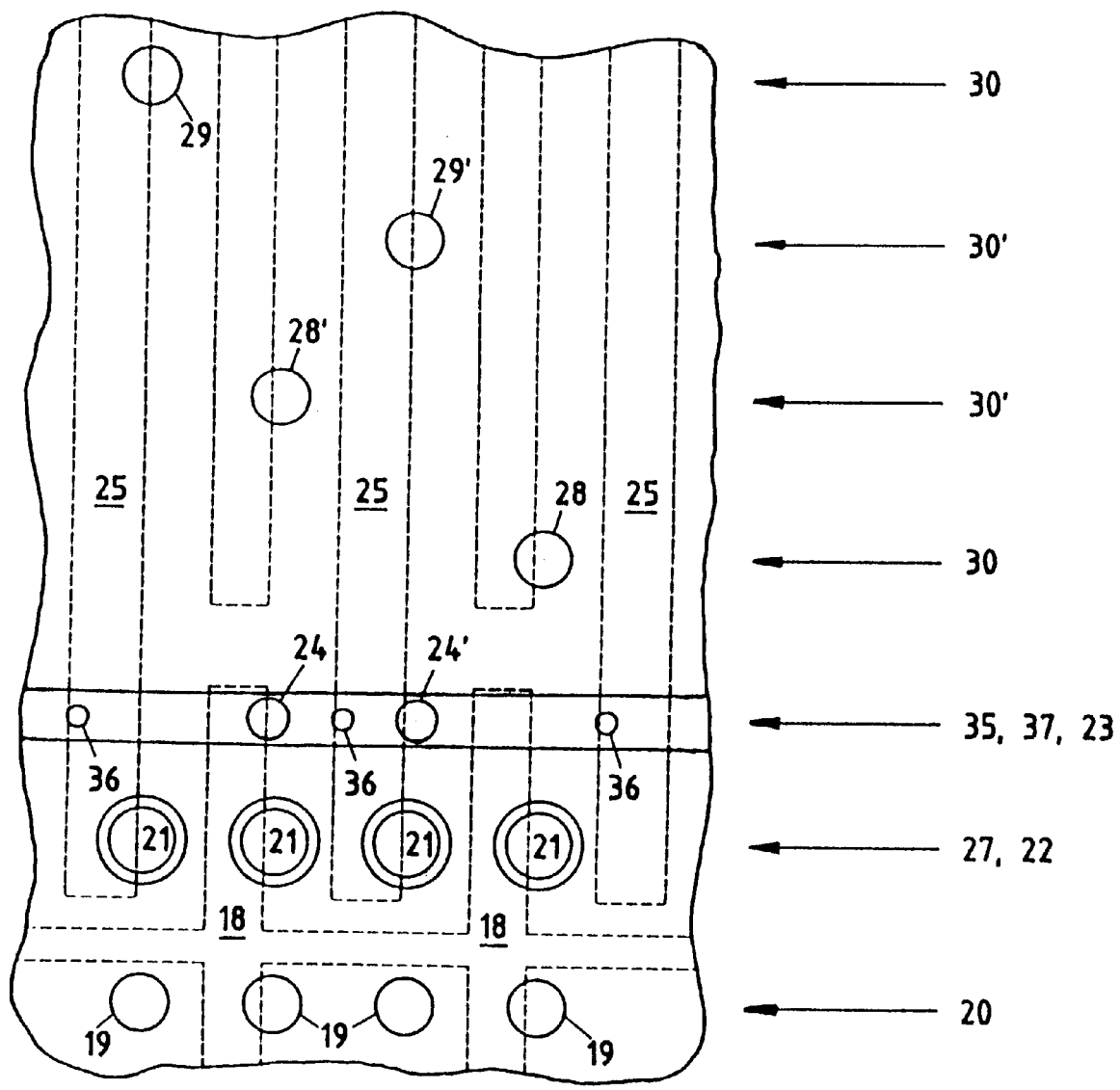
FIG. 4 is a control valve in power-assisted steering mode when making a left turn.
Figure 5:
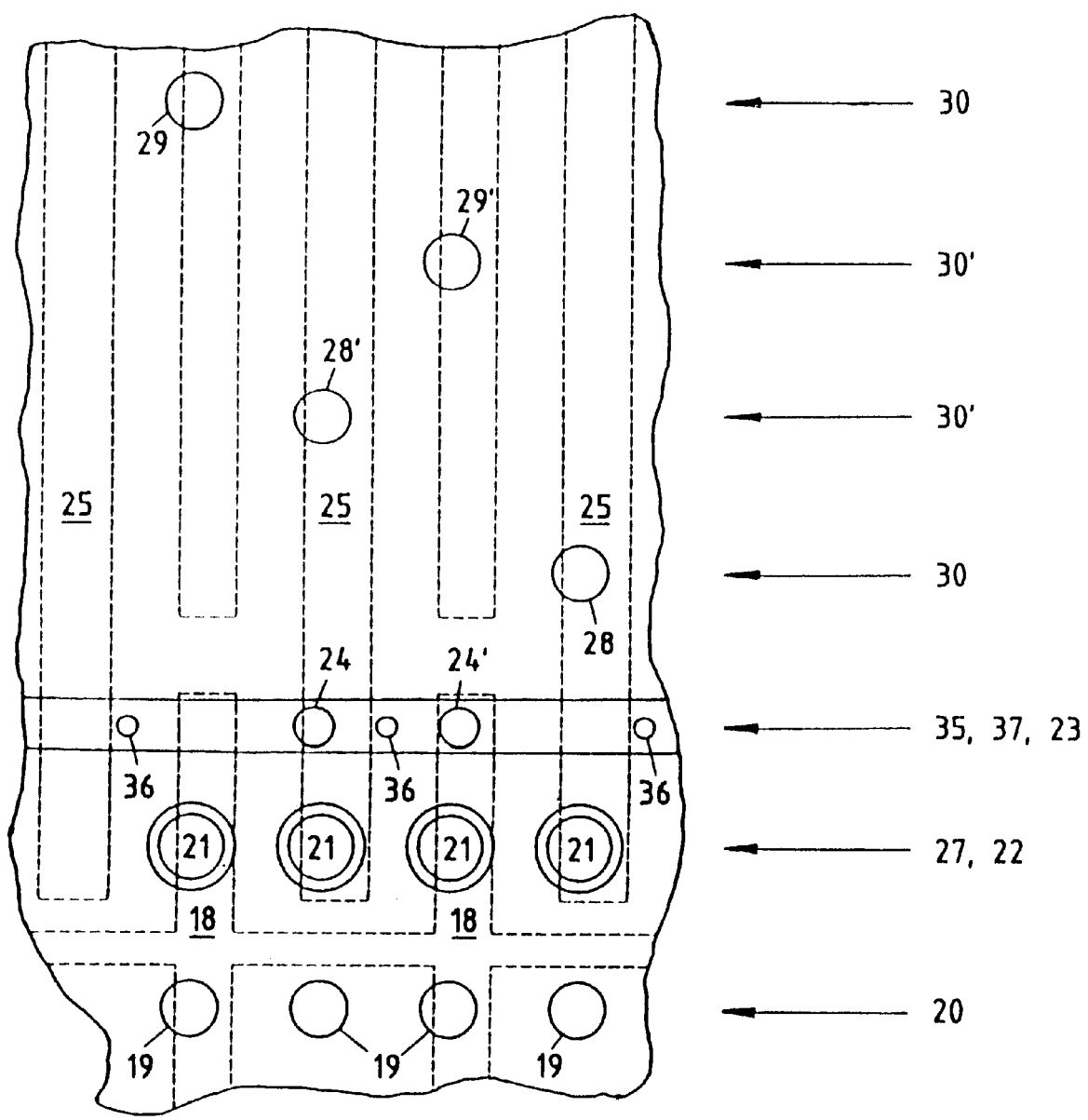
FIG. 5 is a control valve in power-assisted steering mode and in emergency steering mode when making a right turn.

In the drawings, the hydraulic circuit is simplified for the sake of clarity. The hydraulic circuit includes a steering circuit and a working circuit and has a tank 1, a supply pump 2 and a flow division valve 3. A supply line 4 for a working hydraulics 5 and a supply line 6 for a steering assembly 7 branch off from the flow division valve 3. A steering cylinder 8 is connected after the steering assembly 7.

The steering assembly 7 includes a supply connection 9 connected to the flow division valve 3, two cylinder connections 10 and 10' connected to the steering cylinder 8, a return connection 11 connected to the tank 1 as well as a load signal connection 12 connected to the spring-biased side of the flow division valve 3.

The steering assembly 7 essentially comprises a control valve 13 and a metering pump 14 which operates according to the orbit principle and includes an outer ring with, for example, seven teeth and a rotor gearwheel which in this example has six teeth.

The control valve 13 is fitted in a housing and has a conventional inner control piston controllable from a steering wheel 15 and an outer control sleeve mechanically connected to the rotor of the metering pump 14. Control piston and control sleeve are arranged concentrically with respect to each other and are rotatable over a limited range against the biasing force of a spring.

The control valve 13 includes six supply lines 16, 16' which operate in parallel and are connected to both the supply connection 9 and the input side of metering pump 14, and a total of six cylinder lines 17, 17' which are connected to both the output side of metering pump 14 and to one of the cylinder connections 10 and 10'.

In the supply lines 16, 16' of the control piston, there are disposed channels 18 which in conjunction with bores 19 in the control sleeve form the first adjustable input throttles 20 and which in conjunction with the bores 21 form the supply throttles 22. From each supply line 16, there branches off an adjustable flow amplification supply throttle 23 disposed between the first input throttle 20 and the supply throttle 22. These flow amplification supply throttles 23 are formed by the channels 18 of the control piston and by bores 24 in the control sleeve when turning left and by bores 24' when turning right.

In conjunction with the bores 21 in the control sleeve, each of the channels 25 in the control piston forms in the cylinder lines 17, 17' a return throttle 27 of the metering pump. The channels 25 form the throttles 30 in conjunction with the bores 28 when turning right, and in conjunction with the bores 29 when turning left. The channels 25 form the throttles 30' in conjunction with the bores 28' when turning right and in conjunction with the bores 29' when turning left. The throttles 30 are formed by three of the channels 25 which are rotated relative to each other by 120°, while the throttles 30' are formed by three of the channels 25, also rotated relative to each other by 120. The throttles 30 are connected to a common line 31 which merges in the cylinder connection 10. The throttles 30' are connected to a common line 32 through a check valve 33 which opens in the direction of the common line 31.

Within the steering assembly 7, there extends a common line 34 which bypasses the metering pump 14 and is connected to the flow amplification supply throttles 23 and also to each of the cylinder lines 17, 17' by way of the flow amplification return throttles 35. These flow amplification return throttles 35 are formed by the channels 25 of the control piston and by bores 36. Connected in parallel with each second flow amplification return throttle 35 is a flow amplification return throttle 37 which merges in the cylinder line 17 before each respective throttle 30'.

When the steering assembly 7 is not operated, the control sleeve and the control piston of the control valve 13 are in the neutral position, with the first adjustable input throttle 20, the supply throttles 22, the return throttles 27, the throttles 30 and 30', the throttles 37 and the flow amplification supply throttle 23 all closed, and the throttles 35 of the flow amplification return fully open.

The oil supplied by the supply pump 2 generates a pressure in the supply line 6 before the closed first adjustable input throttle 20 of the steering assembly 7. This pressure is transmitted as a pressure signal to the side of the flow division valve 3 which is not spring-biased.

When the steering wheel 15 is turned, the control piston is displaced relative to the control sleeve, thereby opening the first adjustable input throttles 20 and the other throttle locations.

The hydraulic oil supplied by the supply pump 2 in power-assisted steering mode flows through the supply line 6 to the supply connection 9 by way of the flow division valve 3 which is switched by the pressure present in the load signal circuit. From here, the oil flows to the metering pump 14 through the first adjustable input throttles 20 and the supply throttles 22; from there the oil is transferred as a measured quantity to the steering cylinder 8 through the cylinder lines 17, 17' and the common lines 31, 32. In this case, the throttles 30 and 30' are carrying flow.

Figure 6:
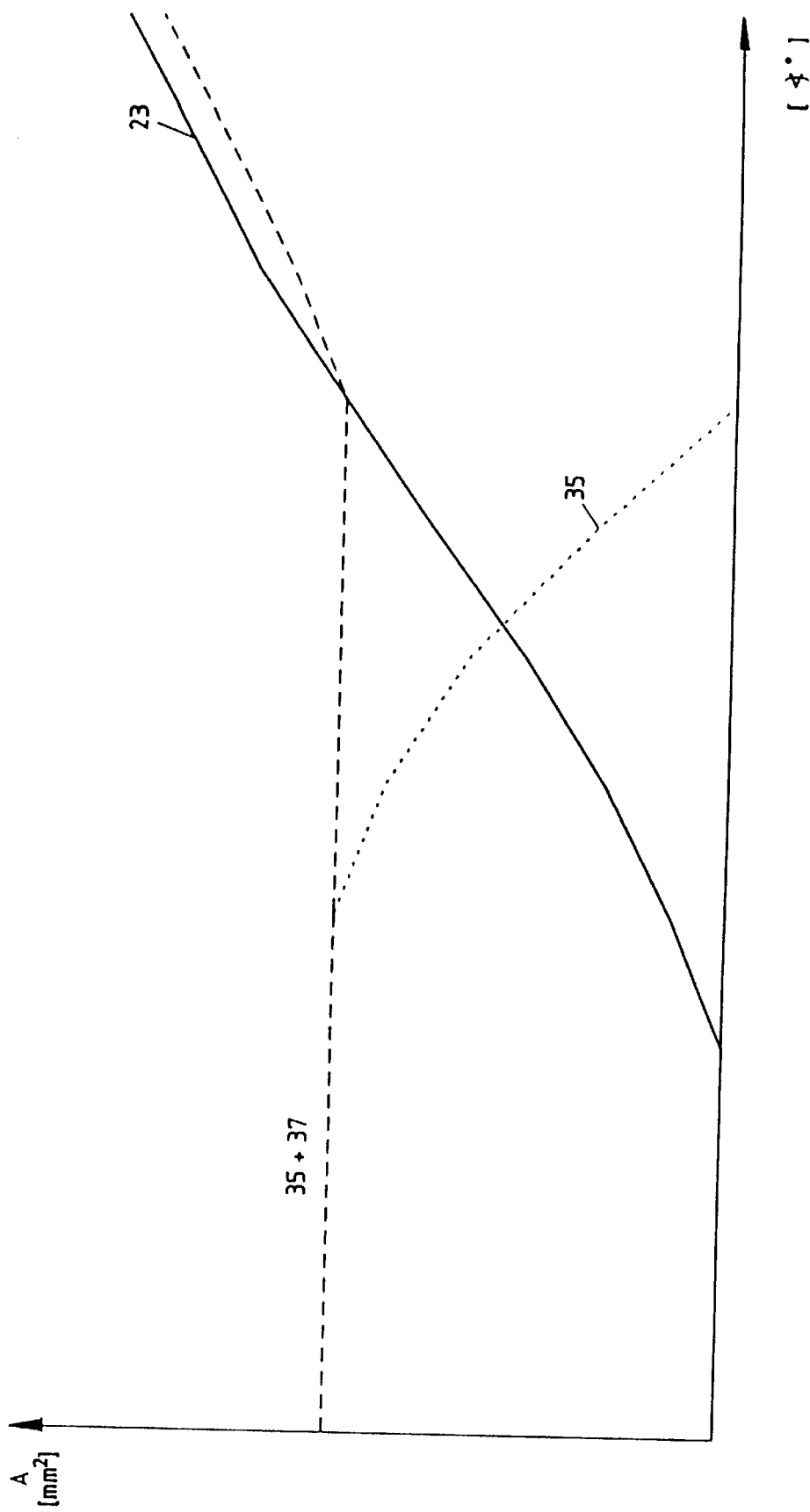
FIG. 6 is a diagram illustrating the opening characteristics of the contributing throttles.

Based on the opening and closing state of the return throttles 27, a pressure differential is created before the supply throttles 22 which causes a shunt current to flow parallel to the main flow through the unblocked cross sections of the flow amplification supply throttles 23 and the common line 34 as well as through the unblocked cross sections of the flow amplification return throttles 35 and 37. As indicated in FIG. 6, the oil flows through both flow amplification return throttles 35 and 37 until the control piston reaches a predetermined excursion point in relation to the control sleeve of the control valve 13. The cross section of the flow amplification return throttle 37 increases at least in the same proportion as the cross section of the flow amplification return throttles 35 decreases. When the predetermined excursion point is reached, the flow amplification return throttles 35 close so that the shunt flow can return only through the flow amplification return throttles 37. With this design, the sum of the cross sections of both flow amplification return throttles 35 and 37 is almost constant or increases only slightly over the entire excursion of the control valve 13.

The flow amplification supply throttles 23 open later than the first adjustable input throttles 20. Before the supply throttles 23 open, only the metered main flow is flowing. When the control piston is further displaced in relation to the control sleeve, the opening cross section of the flow amplification supply throttles 23 increases such that the corresponding curve intersects the curve of the opening cross sections of both flow amplification return throttles 35 and 37 at a predetermined point. The shunt flow flowing parallel to the main flow then increases strongly with each rotation of the steering wheel until the point of intersection is reached, whereafter the shunt flow remains constant or increases only slightly.

In emergency steering mode, i.e. when the supply pump 2 is switched off, the supply line 6 is unpressurized. The working hydraulics 5 can no longer be supplied with oil. The oil required for the steering circuit is now drawn from the metering pump 14 and supplied to the steering cylinder 8 solely by manual operation of the steering wheel 15. A partial vacuum is created in the area of the first input throttles 20 and the supply throttles 22. The partial vacuum extends through the flow amplification supply throttles 23, the common line 34, the flow amplification return throttles 37 and the throttles 30' to the common line 34. In this operating state, the flow amplification return throttles 35 are closed. Because of the partial vacuum in the common line 32 and the pressure in the common line 31, the check valve 33 closes in the direction of the common line 32. As a result, the pressure chambers of the metering pump 14 which are connected to the flow amplification return throttles 37, are shunted through the common line 34 with the intake chambers of the metering pump 14 which are connected to the flow amplification supply throttles 23.

Consequently, only the three other chambers of the metering pump 14 are operating and only the oil residing in these chambers has to be drawn from the return line. The displacement volume is determined solely by the metering pump 14 and the number of disconnected chambers.

If, for example, a metering pump 14 with a displacement volume of 200 cm$^3$/revolution is used and three chambers are disconnected, then 200 cm$^3$/revolution is obtained in power-assisted steering mode when the steering wheel is turned slowly, 320 cm$^3$/revolution when the steering wheel is turned rapidly, and 100 cm$^3$/revolution in emergency steering mode. Consequently, the largest transmission ratio is 3.2/1. For other situations, different transmission ratios can be predetermined.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. Hydraulic steering assembly with change in transmission ratio and flow amplification, comprising:

a control valve (13) and a metering pump (14), a supply connection (9), a return connection (11) and two cylinder connections (10, 10'), wherein the control valve (13) comprises an inner control piston which can be controlled from the steering wheel (15), and an outer control sleeve which is mechanically connected to the rotor of the metering pump (14), wherein the control piston and the control sleeve are capable of rotating relative to each other over a limited range and include several supply lines (16, 16') in mutual communication with each other, and wherein the metering pump (14) is connected to the supply connection (9) by way of the supply lines (16, 16') and to one of the cylinder connections (10, 10') by way of an equal number of cylinder lines (17, 17'), wherein selected cylinder lines (17) are capable of being disconnected from the oil flow supply, and wherein in each supply line (16, 16') there are disposed an input throttle (20) and a supply throttle (22) and in each return line (17, 17') there are disposed a first return throttle (27) and a second return throttle (30, 30'), a common line (34) is provide bypassing the metering pump (14), and wherein the common line (34) is designed to serve during power-assisted steering mode as a supply line for flow amplification and to serve during emergency steering mode as a return line for the cylinder lines (17) disconnected from the oil flow feed, wherein the common line (34) is connected to a predetermined number of the supply lines (16) by way of flow amplification supply throttles (23) and to the associated cylinder lines (17) by way of flow amplification return throttles (37), and the common line (34) is connected to all cylinder lines (17, 17') by way of second flow amplification return throttles (35), and the first flow amplification return throttles (37) are disposed in parallel with the associated second flow amplification return throttles (35), and the flow amplification supply throttle (23) and the two flow amplification return throttles (35, 37) have a mutually coordinated opening.

2. The hydraulic steering assembly of claim 1, wherein the cylinder lines (17) merge with a common line (32) and the cylinder lines (17') merge with a common line (31), wherein both lines (17, 17') are separated by a check valve (33) closing in the direction of the common line (32).

3. The hydraulic steering assembly of claim 1, wherein the common line (34) merges with the supply lines (16) between the input throttles (20) and the supply throttles (22) and with the cylinder lines (17, 17') between the return throttles (27) and the throttles (30, 30').

4. The hydraulic steering assembly of claim 1, wherein the sum of the orifice cross sections of the closing flow amplification return throttle (35) and of the opening flow amplification return throttle (37) remain approximately constant form the neutral position to a predetermined excursion angle, the flow amplification supply throttle (23) opens after reaching a predetermined excursion angle, but before the flow amplification return throttle (35) closes, the flow amplification return throttle (35) closes before reaching the maximum excursion angle, and the cross sections of the flow amplification supply throttle (23) and the flow amplification return throttle (37) become identical in size and change in an approximately identical fashion with increasing excursion angle.

5. The hydraulic steering assembly of claim 4, wherein the cross sections of the flow amplification supply throttle (23) and the first flow amplification return throttle (37) increase after the second flow amplification return throttle (35) closes.

6. The hydraulic steering assembly of claim 1, wherein the cross sections of the flow amplification supply throttle (23) are formed by an axial channel (18) disposed in the supply line (16) and by a radial bore (24 or 24'), wherein both the axial channel (18) and the radial bore (24 or 24') in their respective neutral position have a negative overlap with a radial spacing.

7. The hydraulic steering assembly of claim 1, wherein the flow amplification return throttle (37) is formed by a channel (25) disposed in the cylinder line (17, 17') and by a radial bore (24 or 24'), wherein both the channel (25) and the radial bore (24 or 24') in their respective neutral position have a negative overlap with a radial spacing.

8. The hydraulic steering assembly of claim 1, wherein the flow amplification return throttle (35) is formed by a channel (25) disposed in the cylinder line (17, 17') and by a radial bore (36), wherein both the channel (25) and the radial bore (36) in their respective neutral position have a positive overlap.

* * * * *